United States Patent Office 2,929,509
Patented Mar. 22, 1960

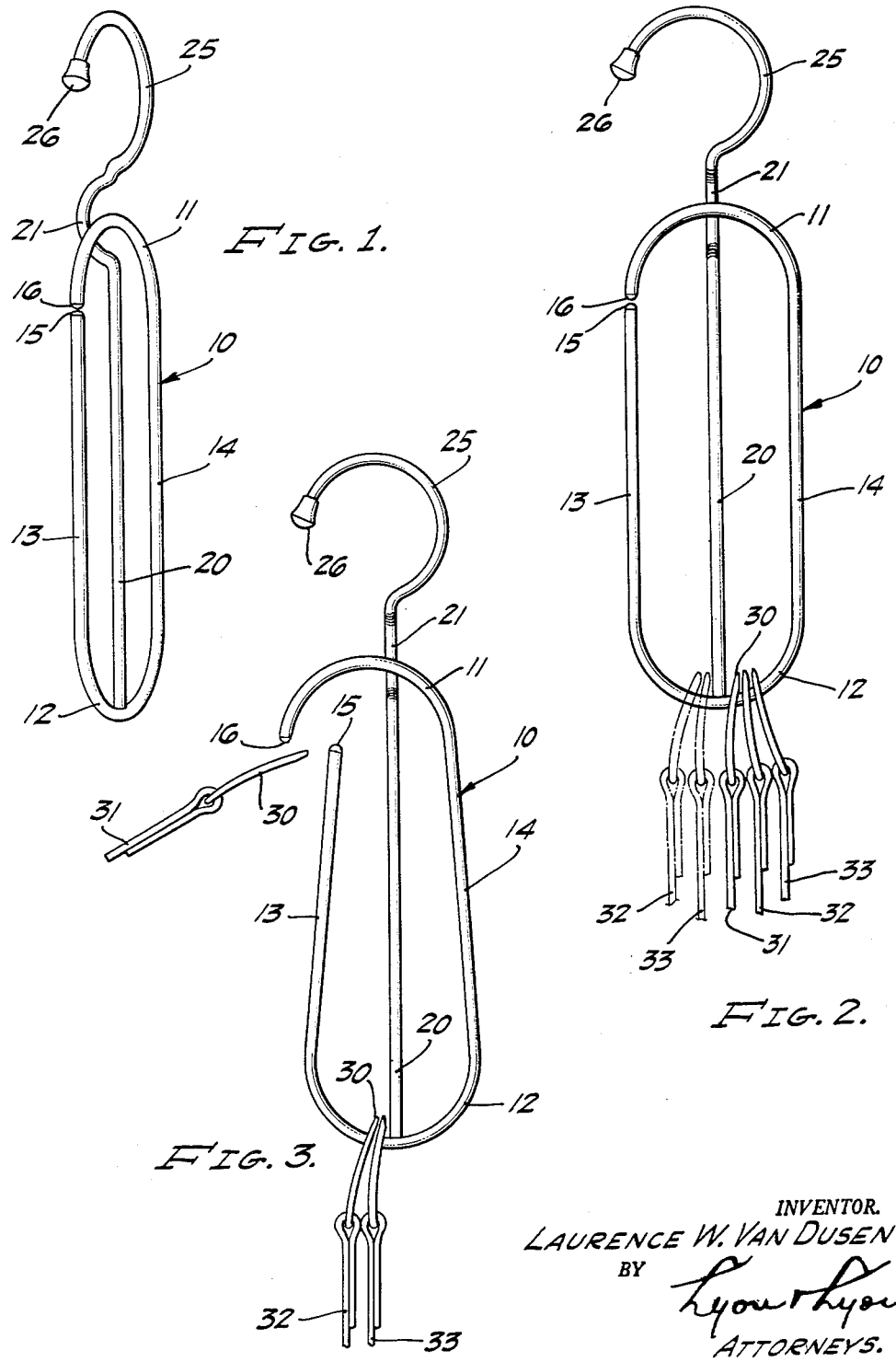

2,929,509

BELT HANGER

Laurence W. Van Dusen, Escondido, Calif., assignor to Mission Industries, National City, Calif., a corporation of California Application June 28, 1956, Serial No. 594,452

5 Claims. (Cl. 211—59)

This invention relates generally to garment hanging devices and has particular reference to a hanger for belts and the like.

One of the principal objects of this invention is to provide a novel form of belt hanger.

Another object of this invention is to provide a belt hanger of simple and inexpensive construction, yet which is designed to hold a large number of belts and which permits quick and easy access to any one or all of the belts as desired.

Other objects and advantages of this invention, it is believed, will be readily apparent from the following detailed description of a preferred embodiment thereof when read in connection with the accompanying drawings.

In the drawings:

Figure 1 is a perspective view of the belt hanger device.

Figure 2 is a front elevation of the belt hanger.

Figure 3 is a view similar to Figure 2 but illustrating the position of the hanger when a belt is removed therefrom or is replaced thereon.

Referring now to the drawings, it will be seen that the device of this invention is constructed mainly of heavy wire or rod. It includes a generally oval body member 10 formed of a single length of wire. The oval shape is not critical, however. Those skilled in the art will understand that the body member may be of any desired configuration so long as it is substantially in the form of a loop of wire, rod, or other material.

The specific shape of the body member shown comprises top and bottom semi-circular or curved portions 11 and 12 separated by means of straight vertical portions 13 and 14. The two ends 15 and 16 of the body member wire are rounded off as shown and are closely spaced to provide an opening therebetween. Secured centrally of the lower curved portion 12 is a substantially vertical leg 20 which lies in the plane of the body member and coaxial with the major axis of the oval. The leg merges with a curved portion 21 which curves around the center of the top curved portion 11. Integral with the curved portion 21 is a hook portion 25 for supporting the hanger upon a clothes pole or the like. The end of the hook portion 25 is preferably provided with a rubber or rubber-like tip element 26.

In use of the device, the portion 13 is sprung inwardly as shown in Figure 3 (or outwardly if desired) to permit the buckle 30 of a belt 31 to be inserted over the end 15 of the body member. The belt may then be carried around on the body member (past the curved portion 21) to the position of the other belts 32 and 33 which hang from the bottom curved portion 12, as shown in Figure 2. In removing any desired belt (such as, in this case, the belt 31) the belts hanging to the right thereof (as would appear in the drawings) are carried around the body member as a group to the position indicated in Figures 2 and 3. The belt 31 may then be carried around to the space between the ends and removed from the hanger by again springing the portion 13 inwardly as above.

It will thus be understood that a plurality of belts may be stored on the hanger, and, moreover, that any one belt may be quickly selected and removed. The hanger is adapted to be hung in any convenient place and requires only a minimum of space.

Having fully described my invention, it is to be understood that I do not wish to be limited to the details set forth, but my invention is of the full scope of the appended claims.

I claim:

1. A hanger for belts comprising a body member of a single length of wire bent into an oval shape, the ends of said wire being slightly spaced apart, a leg member attached at one end to the body member and extending coaxially of the major axis thereof, a curved portion forming an extension of said leg member and curving around a portion of said body member opposed to the point of attachment of said leg member, and a hook member forming an extension of said curved portion.

2. A hanger for belts comprising a body member consisting of a single length of a relatively thin, resilient material in the form of a loop, the ends of said material being slightly spaced apart, a leg member attached at one end to the loop and extending from the point of attachment across the space circumscribed by the loop, and a hook member carried on the other end of said leg member.

3. A hanger for belts comprising a body member consisting of a single length of wire formed into a loop, the ends of said wire being slightly spaced apart, a leg member consisting of a single length of wire attached at one end to the loop and extending from the point of attachment across the space circumscribed by said loop, and a hook member integral with the other end of said leg member.

4. A hanger for belts comprising a body member consisting of a single length of a relatively thin, resilient material in the form of a loop, the ends of said material being slightly spaced apart, a leg member attached at one end to the loop and extending from the point of attachment across the space circumscribed by the loop, the leg member being provided with a curved portion curving around a portion of the loop substantially diametrically opposed to the point of attachment of said leg member and a hook member carried on the other end of said leg member.

5. A hanger for belts comprising a body member consisting of a single length of wire formed into a loop, the ends of said wire being slightly spaced apart, a leg member consisting of a single length of wire attached at one end to the loop and extending from the point of attachment across the space circumscribed by said loop, the leg member being provided with a curved portion curving around a portion of the loop substantially diametrically opposed to the point of attachment of said leg member and a hook member integral with the other end of said leg member.

References Cited in the file of this patent

UNITED STATES PATENTS

| 597,016 | Parker | Jan. 11, 1898 |
| 620,211 | Aikin | Feb. 28, 1899 |
| 1,711,070 | Suydam | Apr. 30, 1929 |
| 2,108,678 | Kulhawy | Feb. 15, 1938 |
| 2,520,461 | Green | Aug. 29, 1950 |

FOREIGN PATENTS

| 1,121,461 | France | Apr. 30, 1956 |